POLAR GROUNDED LOOP D.C. TELEGRAPH RECEIVER CIRCUIT

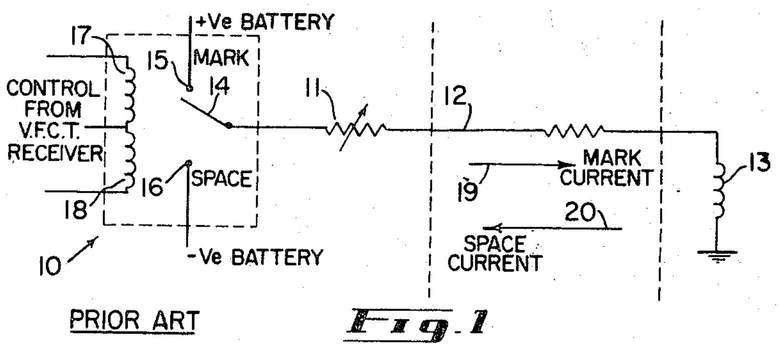
PRIOR ART FIG. 1
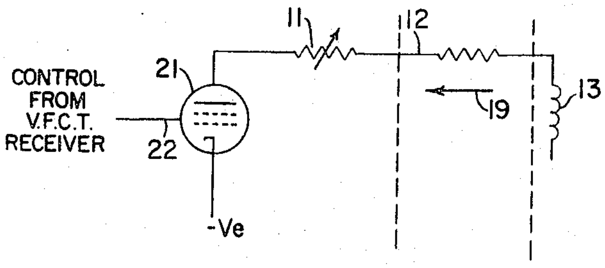
PRIOR ART FIG. 2
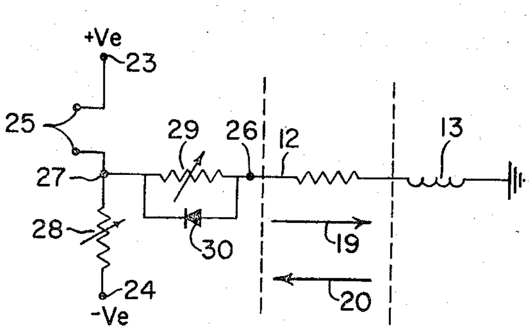
FIG. 3
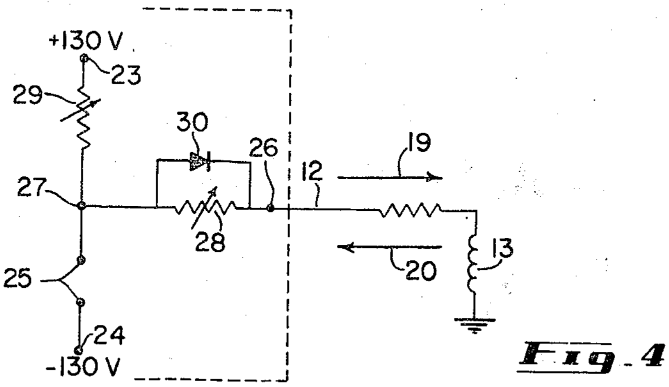
FIG. 4
JOHN SMILLIE MYLES
BY: Diggins, O'Boyle & Hamon May 23, 1967 J. S. MYLES 3,321,578

Filed Sept. 19, 1963 2 Sheets-Sheet 2

JOHN SMILLIE MYLES

BY: Diggins, O'Boyle & Harmon

United States Patent Office 3,321,578

Patented May 23, 1967

3,321,578

POLAR GROUNDED LOOP D.C. TELEGRAPH RECEIVER CIRCUIT

John S. Myles, Ottawa, Ontario, Canada, assignor to Northern Electric Company, Limited, Montreal, Quebec, Canada Filed Sept. 19, 1963, Ser. No. 309,951
10 Claims. (Cl. 178—68)

ABSTRACT OF THE DISCLOSURE

A simple and reliable substitute for a polar relay consisting of a pair of resistors and a diode connected to sources of opposite polarity and to the customer's line so that by operation of a single pole, single throw switch, polar operation of the receiving equipment can be effected.

The present invention relates to a circuit for the polar operation of D.C. telegraph receiving equipment.

D.C. telegraph receiving apparatus is normally constructed either for polar or neutral operation. Neutral operation is where a current flowing in the receiving loop represents the teleprinter MARK signal and an absence of current in the receiving loop represents the teleprinter SPACE signal. In polar operation, the MARK signal is represented by a direct current flowing in one direction through the receiving loop and the SPACE signal is represented by a direct current flowing in the opposite direction through the receiving loop. One terminal of the telegraph receiving apparatus is connected to the end of the loop, or line, and the other terminal of the receiving equipment is grounded. In the present application, reference will be made to a grounded loop, or line, and this term is intended to refer to the situation where the receiving equipment is connected between ground and the loop, or line, leading to the central office equipment. Thus, such a line is not directly connected to ground, but is grounded through the telegraph receiver.

Polar relays have, up until the present, been used for providing polar operation on a grounded loop, or line, leading to a customer's telegraph receiver. These polar relays are normally provided with two or more operating windings or coils through which currents may be passed to cause the relay to make connections from a movable contact to either of two fixed contacts which are connected to direct current voltage sources of opposite polarity. These relays thus are subject to continual operation, which necessitates frequent repair and adjustment of the contacts, as well as frequent replacement. These relays are expensive and difficult to manufacture, and have not proved entirely satisfactory in use due to mechanical inertia, sticking and other defects to which electromagnetic relays are prone. Also, these relays are relatively large, requiring appreciable mounting space, and consume considerable power.

Accorditngly, it is desirable to dispense with the use of polar relays and to substitute in their place circuits which have no moving contacts but which are the electrical equivalent of a polar relay. One previous attempt to solve this problem is illustrated in the teachings of Canadian Patent No. 650,384, issued Oct. 16, 1962, and in particular Figure 2 of that patent which shows a polar relay arrangement using pairs of transistor oscillators which are transformer coupled to operate transistor switches of the single pole single throw type. A problem with this type of circuit is that it requires two separate inputs to operate the polar relay, one input for the MARK condition, and one for the SPACE condition. Further, it will be appreciated that if the two halves of the circuit are turned on simultaneously, a malfunction will occur which might possibly result in the destruction of the transistors and, in any event, would not provide the desired currents through the line. Thus, for reliable operation of this circuit, it would be essential to ensure that the energizing signals to this equipment were carefully timed to prevent the simultaneous arrival of MARK and SPACE signals, or alternatively, to prevent one-half of the apparatus being turned on until the other half has been shut off. It will also be noticed that this circuit is a relatively complex arrangement requiring a considerable number of components including four transformers, four transistors, plus diodes, resistors and capacitors.

The present invention provides a simple and reliable circuit for the polar operation of a telegraph loop, which may be constructed in a very small space using relatively few components of simple and dependable form. The circuit, in accordance with the invention, may be actuated by any one of a number of switching devices having the effective operation of a single pole single throw switch. Thus, a single input signal is required to transfer the circuit of the present invention from the marking to the spacing condition. The switching device for use with the circuit of the present invention may be either a solid state or vacuum tube switching device, but would not normally be an electro-mechanical relay. The circuit of this present invention is particularly adapted for use with a voice frequency carrier telegraph apparatus constructed entirely from solid state circuits without the use of electromagnetic relays or vacuum tubes. It will be appreciated that the present invention is not, however, restricted solely for use with solid state circuits and its advantages may be obtained with other types of switching devices.

In accordance with the present invention, a circuit for providing direct currents flowing in opposite directions in a grounded D.C. telegraph loop, to provide polar operation of telegraph equipment connected in said loop, comprises a first terminal for connection to the loop, a second terminal for connection to a first source of direct current voltage of given polarity having its other terminal grounded, and a third terminal for connection to a second source of direct current voltage of polarity opposite to the first source, having its other terminal grounded. A pair of terminals for connection to single pole single throw switch means is also provided, one of the pair of terminals being connected to the third terminal. The other of the pair of terminals is connected to a first resistor which is in turn connected to the second terminal. A second resistor is connected in parallel with a diode and between the first terminal and the juncture of the first resistor and the other of the pair of terminals. The diode is poled to conduct conventional current between the second terminal and the first terminal. The value of the resistor is chosen to cause a predetermined current to flow between the second terminal and the first terminal when the pair of terminals is open circuited, and the resistance of the second resistor is chosen to cause a predetermined current to flow between the first terminal and the third terminal when the pair of terminals is shorted.

In general, the present invention provides a circuit for causing direct currents of opposite polarities to flow in a grounded line which comprises a first pair of terminals, each of which is connected to a source of direct current voltage of polarity opposite to the polarity of the source connected to the other terminal, the sources having their free terminals grounds, a second pair of terminals for connection to a single pole single throw switch means, the second pair of terminals being connected in series with a first resistor and between the first pair of terminals, and a second resistor connected in parallel with a diode and between the line and the juncture of the first resistor and the second pair of terminals. The diode is poled to cause current to flow between the line, and the terminal of the first pair of terminals to which the first resistor is connected and when the second pair of terminals is open circuited, and current flows between the line and the other terminal of the first pair of terminals when the second pair of terminals is shorted.

In drawings which illustrate prior art devices and the present invention;

FIGURE 1 is a schematic diagram of a conventional polar relay arrangement,

FIGURE 2 is a schematic diagram of a circuit for neutral operation,

FIGURE 3 is a scehmatic diagram of one embodiment of the invention,

FIGURE 4 is a schematic diagram of an alternative embodiment of the invention.

Figure 5:
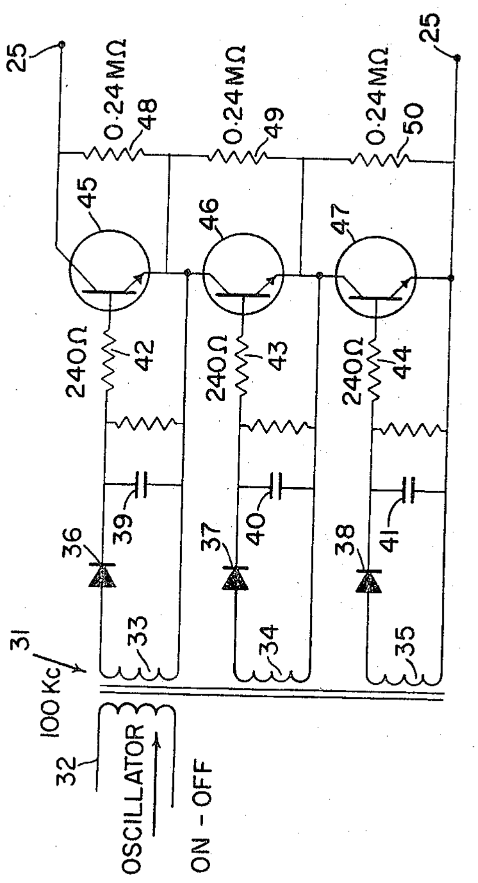
FIGURE 5 illustrates a form of single pole single throw switch circuit suitable for use with the present invention.

In FIGURE 1, a polar relay 10 is shown connected by a loop pad resistor 11 to a customer's loop 12, which is terminated in a D.C. telegraph reader 13 or other similar device. The polar relay 10 includes a movable contact 14 and fixed contacts 15 and 16. The fixed contact 15 is connected to a positive battery voltage, and the fixed contact 16 is connected to a negative battery voltage. The movable contact 14 is controlled by currents flowing in the coils 17 and 18. When the movable contact 14 is connected to the fixed contact 15, current flows from the positive battery in the direction shown by the arrow 19 to the telegraph reader 13, and when the movable contact 14 is connected with the fixed contact 16, current flows from the reader 13 to the negative battery in the direction shown by the arrow 20. In order to obtain proper operation of the polar relay 10, coils 17 and 18 must be energized by separate input currents of opposite polarity.

FIGURE 2 shows a neutral D.C. telegraph circuit controlled by a vacuum tube 21 which conducts for a MARK signal and is cut-off for a SPACE signal, and is controlled by voltages applied to the grid 22 of the vacuum tube 21. As in FIGURE 1, a loop pad resistor 11 is provided for adjusting the quantity of current flowing in the customer's loop 12. As in FIGURE 1, the loop 12 is terminated in a reader, or other suitable receiver 13. The arrow 19 represents the direction of current during the MARK condition, the SPACE condition being represented by the absence of current in the customer's loop 12. The disadvantage of neutral operation of a telegraph loop is that bias distortion due to capacitance of the customer's is present which distorts the telegraph signals.

FIGURE 3 illustrates an embodiment of the invention. A terminal 23 is provided for connection to a source of positive voltage and a terminal 24 is provided for connection to a source of negative voltage. A pair of terminals 25 is provided for connection to a single pole single throw switch means, and a terminal 26 is provided for connection to the customer's loop 12. The customer's loop 12 is, as before, terminated by a receiver 13. Between the terminal 24 and the juncture 27, a variable resistor 28 is connected, which is provided for adjusting the value of the SPACE current. Similarly, a variable resistor 29 is provided for adjusting the value of the MARK current. A diode 30 bypasses the resistor 29 for SPACE current. When the pair of terminals 25 is open-circuited, current will flow from ground through the reader 13, the customer's loop 12, the diode 30, the resistor 28 to the terminal 24, this current being the SPACE condition of the telegraph signal. As may readily be seen, the value of this current may be controlled by adjustment of the variable resistor 28. When the pair of terminals 25 is short-circuited, current will flow from the terminal 23 through the resistor 29, through the loop 12, the customer's reader 13 to ground. No current will flow through the diode 30 since the diode is reverse biassed at this time. Accordingly, the value of the current flowing in the circuit will be controlled by the setting of the variable resistor 29. The circuit is in the MARKING condition and the MARK current is illustrated by the arrow 19.

FIGURE 4 shows an alternative form of circuits in accordance with the invention, in which the pair of terminals 25 is connected between the juncture 27 and the terminal 24, instead of between the juncture 27 and the terminal 23. The variable resistor 28 is now connected between the terminal 26 and the juncture 27 and is bypassed by the diode 30, and the variable resistor 29 is now connected between the terminal 23 and the juncture 27. The operation of this circuit is substantially as described above. When the terminals 25 are open-circuited, current flows from the terminal 23 through the resistor 29, the diode 30, the customer's loop 12 to the receiver 13. This is the MARK current and the direction is shown by the arrow 19. When the pair of terminals 25 is short-circuited, current flows from ground through the reader 13, the loop 12, the variable resistor 28 to the terminal 24. No current will flow through the diode 30, since the diode is reverse-biassed in this condition. This is the SPACE condition of the circuit and the flow of current is illustrated by the direction of the arrow 20.

Various forms of single pole single throw switch means may be connected to the terminals 25. For example, the vacuum tube 21, illustrated in FIGURE 2, could be connected between the terminals, due regard being had to the polarity of the voltages, and would serve to control the operation of the circuit, as previously described. A positive input to the grid 22 of the vacuum tube 21 would cause current to flow between the terminals 25 and would effectively short-circuit the terminals.

A form of transistor switch, which would also be suitable for use in the circuit of the present invention, is illustrated in FIGURE 5. This circuit consists basically of a transformer 31 having a primary coil 32 and secondary coils 33, 34 and 35. An oscillator (not shown) has its output connected to the primary coil 32 and the oscillator is turned on and off, in accordance with the teletype signal being received. The output from the oscillator is also present in the secondaries 33, 34 and 35, where it is rectified by the diodes 36, 37 and 38, filtered by the capacitors 39, 40 and 41, and applied via the resistors 42, 43 and 44 to the base terminals of transistors 45, 46 and 47. The presence of a signal on the base of transistors 45, 46 and 47 will cause current flow from the collector to the emitter of each of the transistors, resulting in a very low impedance appearing between the terminals 25. Resistors 48, 49 and 50 may be provided to balance the circuit, the values of these resistors being sufficiently high that they effectively represent an open circuit across the terminals 25 when the transistors 45, 46 and 47 are cut-off.

Other switching devices will be apparent to those skilled in the art and, accordingly, the applicant does not wish to be limited to a specific form of switch which would be suitable for use with the present invention.

I claim:

1. A circuit for providing direct currents flowing in opposite directions in a grounded D.C. telegraph loop, to provide polar operation of telegraph equipment connected in said loop comprising,
   - a first terminal for connection to said loop,
   - a second terminal for connection to a source of positive direct current voltage, having its negative terminal grounded,
   - a third terminal for connection to a source of negative direct current voltage having its other terminal grounded,
   - a pair of terminals for connection to single pole single throw switch means,
   - one of said pair of terminals being connected to said third terminal,
   - the other of said pair of terminals being connected to a first resistor which is in turn connected to said second terminal, a second resistor connected in parallel with a diode and between said first terminal and the juncture of said first resistor and the other of said pair of terminals, said diode being poled to conduct conventional current from said second terminal to said first terminal, the value of said first resistor being chosen to cause a predetermined current to flow from said second terminal to said first terminal when said pair of terminals is open circuited, the resistance of said second resistor being chosen to cause a predetermined current to flow from said first terminal to said third terminal when said pair of terminals is shorted whereby operation of said switch means causes polar currents to flow in said loop.

2. A circuit for causing direct currents of opposite polarities to flow in a grounded line comprising, a first pair of terminals each for connection to a source of direct current voltage of polarity opposite to the polarity of the source connected to the other terminal of said first pair of terminals, said sources having their free terminals grounded, a second pair of terminals for connection to single pole single throw switch means, said second pair of terminals being connected in series with a first resistor and between said first pair of terminals, a second resistor connected in parallel with a diode and between said line and the juncture of said first resistor and said second pair of terminals, said diode being poled to cause current to flow in said line between said terminal of said first pair of terminals to which said first resistor is connected and ground when said second pair of terminals is open circuited, whereby current flows in said line between the other terminal of said first pair of terminals and ground when said second pair of terminals is shorted.

3. A circuit according to claim 2 in which the resistances of said first and second resistors are chosen to cause equal currents of opposite direction to flow in said line.

4. A circuit according to claim 1 in which the positive and negative sources of direct current voltage have a value of 130 volts.

5. A circuit according to claim 2 in which the positive and negative sources of direct current voltage have a value of 130 volts.

6. A circuit according to claim 3 in which the positive and negative sources of direct current voltage have a value of 130 volts.

7. A circuit according to claim 1 wherein said first and second resistors are variable resistors.

8. A circuit according to claim 2 wherein said first and second resistors are variable resistors.

9. A circuit according to claim 3 wherein said first and second resistors are variable resistors.

10. A circuit according to claim 4 wherein said first and second resistors are variable resistors.

References Cited by the Examiner

UNITED STATES PATENTS 3,076,901 2/1963 Rubin et al. -------- 340—176

FOREIGN PATENTS 1,248,065 10/1960 France.

NEIL C. READ, *Primary Examiner.*

THOMAS A. ROBINSON, *Examiner.*